(12) United States Patent
Busuioc et al.

(10) Patent No.: US 11,485,418 B2
(45) Date of Patent: *Nov. 1, 2022

(54) STRUCTURE FOR ASSEMBLING APPARATUS

(71) Applicant: International Truck Intellectual Property Company, LLC, Lisle, IL (US)

(72) Inventors: Constantin S. Busuioc, Plainfield, IL (US); Jay E. Bissontz, Spencerville, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 415 days.

This patent is subject to a terminal disclaimer.

(21) Appl. No.: 16/790,874

(22) Filed: Feb. 14, 2020

(65) Prior Publication Data

US 2021/0253175 A1 Aug. 19, 2021

(51) Int. Cl.
| | | |
|---|---|---|
| *B62D 21/17* | (2006.01) | |
| *B60P 1/36* | (2006.01) | |
| *B60D 1/06* | (2006.01) | |
| *B62D 21/02* | (2006.01) | |

(52) U.S. Cl.
CPC ............ *B62D 21/17* (2013.01); *B60D 1/06* (2013.01); *B60P 1/36* (2013.01); *B62D 21/02* (2013.01)

(58) Field of Classification Search
CPC ...... B62D 21/17; B62D 21/02; B60R 16/0215
See application file for complete search history.

(56) References Cited

U.S. PATENT DOCUMENTS

| | | | |
|---|---|---|---|
| 6,270,150 B1 * | 8/2001 | Miller | B62D 21/17 296/184.1 |
| 2004/0154326 A1 * | 8/2004 | Hosokawa | B60H 1/00571 62/298 |
| 2020/0112152 A1 * | 4/2020 | Ide | H02G 3/0418 |
| 2021/0253176 A1 * | 8/2021 | Busuioc | B62D 65/16 |

FOREIGN PATENT DOCUMENTS

| | | | | |
|---|---|---|---|---|
| CN | 106080841 A | * | 11/2016 | |
| DE | 102017106299 A1 | * | 9/2018 | |
| EP | 1241053 A2 | * | 9/2002 | ......... B60R 16/0215 |
| EP | 3312056 A1 | * | 4/2018 | ......... B60R 16/0215 |
| GB | 2527485 A | * | 12/2015 | ................ F16L 3/26 |

* cited by examiner

*Primary Examiner* — James A English
*Assistant Examiner* — Matthew D Lee
(74) *Attorney, Agent, or Firm* — Mark C. Bach

(57) ABSTRACT

A structure for assembling a vehicle having an axis of elongation, a frame rail and a cross member extending from the frame rail comprises a conduit extending along the axis of elongation of the vehicle. A conveyor is disposed in the conduit. At least one coupling attaches the conduit with at least one of the frame rail and the cross member.

9 Claims, 9 Drawing Sheets

STRUCTURE FOR ASSEMBLING APPARATUS

BACKGROUND

This disclosure generally relates to a structure and a method for assembling an apparatus. More specifically, this disclosure relates to a structure and a method for assembling a vehicle.

Currently, assembly of an apparatus, such as a vehicle, machinery and the like, is complicated by, for example, variability of physical content and configuration of systems such as energy storage (batteries, capacitors, super capacitors, and the like), electrical control modules, fuel tanks, air tanks, axle controls, engines, transmissions, cabs, chassis frames, and valving among others. This variability can impact an interface of supporting infrastructures such as energy and data communication systems and subsystems such as electrical cables, optical fibers, harnessing, hydraulic lines, pneumatic lines and the like. These supporting infrastructures may need to be vary in areas including but not limited to: manufacturing, routing, clipping, and the like as the supporting infrastructures may link with and connect to numerous, varying systems and subsystems that are served by the supporting infrastructures. A net result of these numerous variabilities and mutual reliance of elements thereof within an apparatus' vehicle's fundamental component configuration results in increased cost and complexity of supporting or servicing elements like electrical cables, optical fibers, harnessing, hydraulic lines, pneumatic lines, and the like, as well as required attachment solutions which must react to increasing variability of the systems and subsystems which they serve.

Increased variability, complexity and cost of some current apparatus and methods of assembling apparatus promotes a need for improved apparatus and methods of assembling apparatus.

SUMMARY

Embodiments disclosed herein relate to a structure and a method for assembling a vehicle having an axis of elongation, a frame rail and a cross member extending from the frame rail. One of the embodiments comprises a conduit extending along the axis of elongation of the vehicle. A conveyor is disposed in the conduit. At least one coupling attaches the conduit with at least one of the frame rail and the cross member.

Another embodiment provides a method for assembling a vehicle having an axis of elongation, a frame rail and a cross member extending from the frame rail. A conduit extends along the axis of elongation of the vehicle. A conveyor is disposed in the conduit. At least one coupling attaches the conduit with at least one of the frame rail and the cross member.

DETAILED DESCRIPTION

This disclosure relates generally to a structure and a method for assembling apparatus. More specifically, this disclosure relates to a structure and a method for assembling a vehicle, such as a truck, a bus, a boat and the like. For the sake of clarity, embodiments discussed herein focus on a truck. However, it is to be recognized that any embodiment discussed herein may be modified members to adapt to any vehicle, machine or other apparatus.

Figure 1:
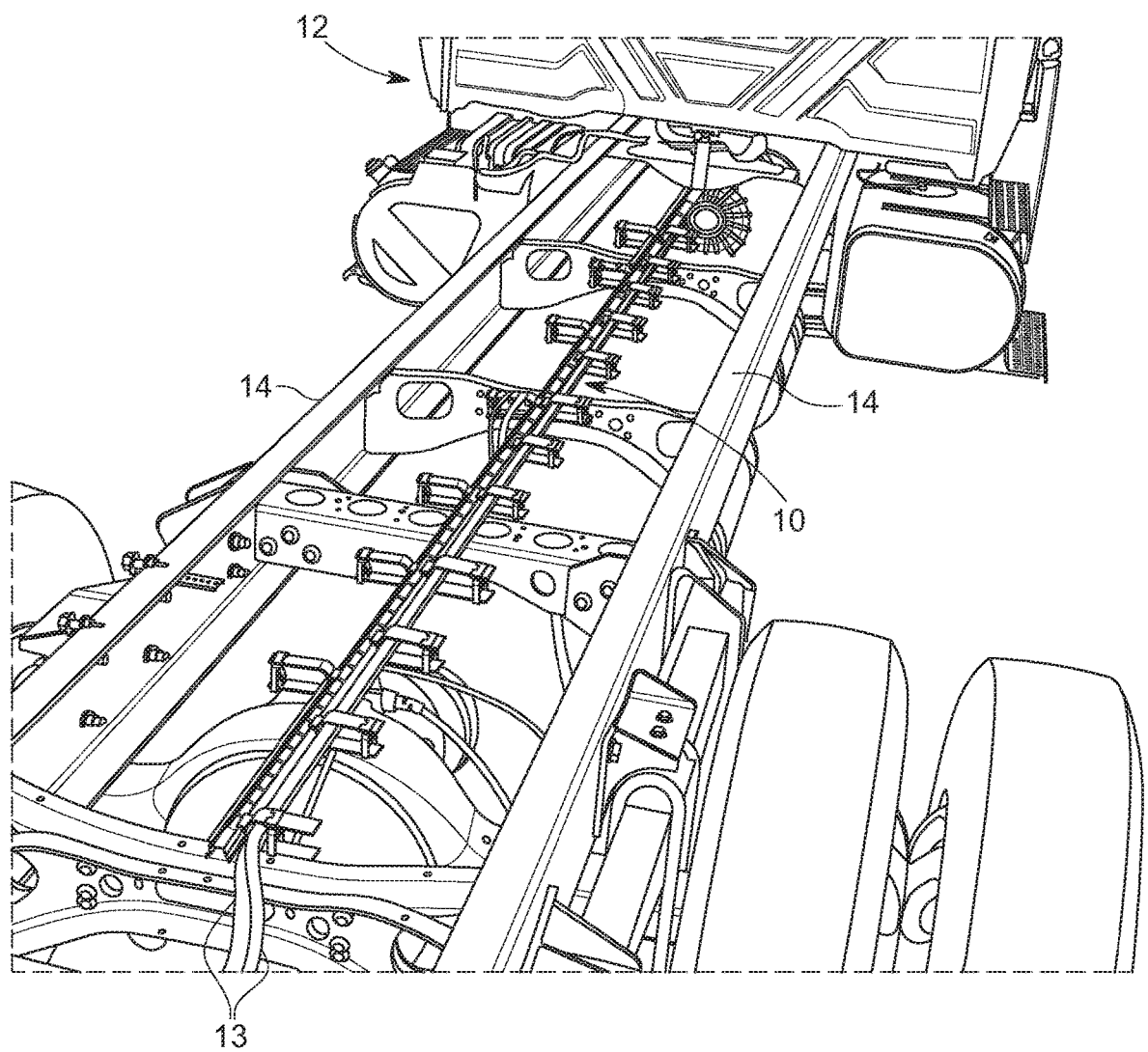
FIG. 1 is a perspective view of a portion of a vehicle having an embodiment of a structure for assembling a vehicle discussed herein.
Figure 2:
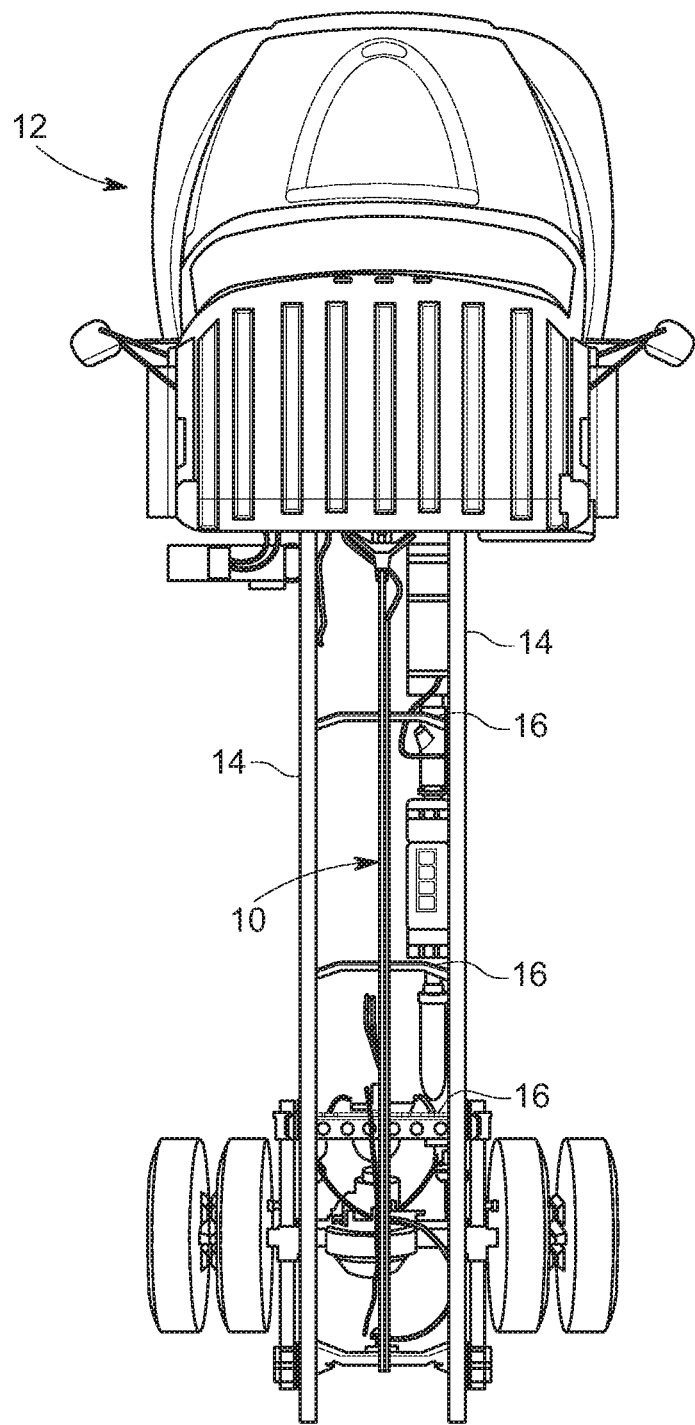
FIG. 2 is another perspective view of a vehicle having an embodiment of a structure for assembling a vehicle discussed herein.

As shown in FIG. 1, an embodiment includes a conduit 10 extending substantially along an axis of elongation of a vehicle 12. The vehicle 12 may include at least one conduit 10. In the embodiment shown in FIG. 1, the conduit 10 extends along a centerline of a chassis of the vehicle 12 in parallel relationship to at least one frame rail 14. The conduit 10 may include at least one conveyor 13, such as an electrical conductor (conveys electrical charge), an optical fiber (conveys wave), a push pull cable (conveys motion) and the like. The at least one conveyor 13 may be added to the conduit 10 at any appropriate time, such as before, during or after assembly of the vehicle 12. As shown in FIG. 2, the conduit 10 may be attached to at least one cross member 16 extending from the frame rail 14 by a coupling. Two embodiments of the coupling are shown in FIGS. 3 through 6.

Figure 3:
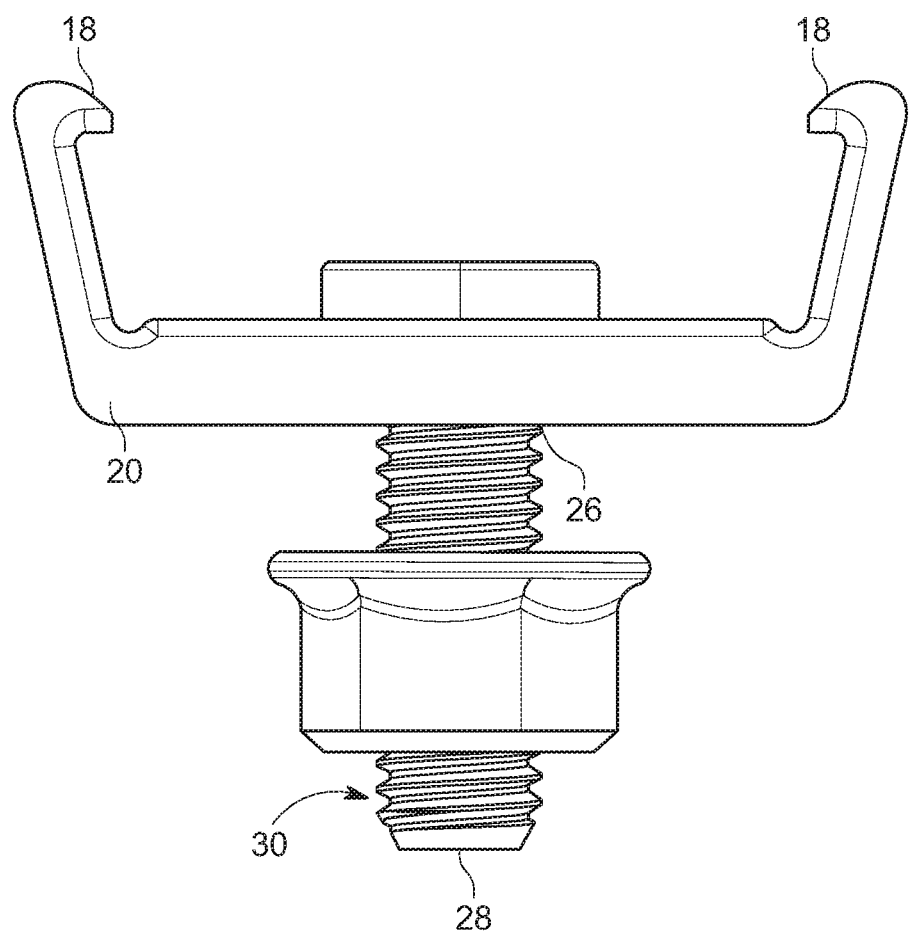
FIG. 3 is a side view of one embodiment of a coupling discussed herein.
Figure 4:
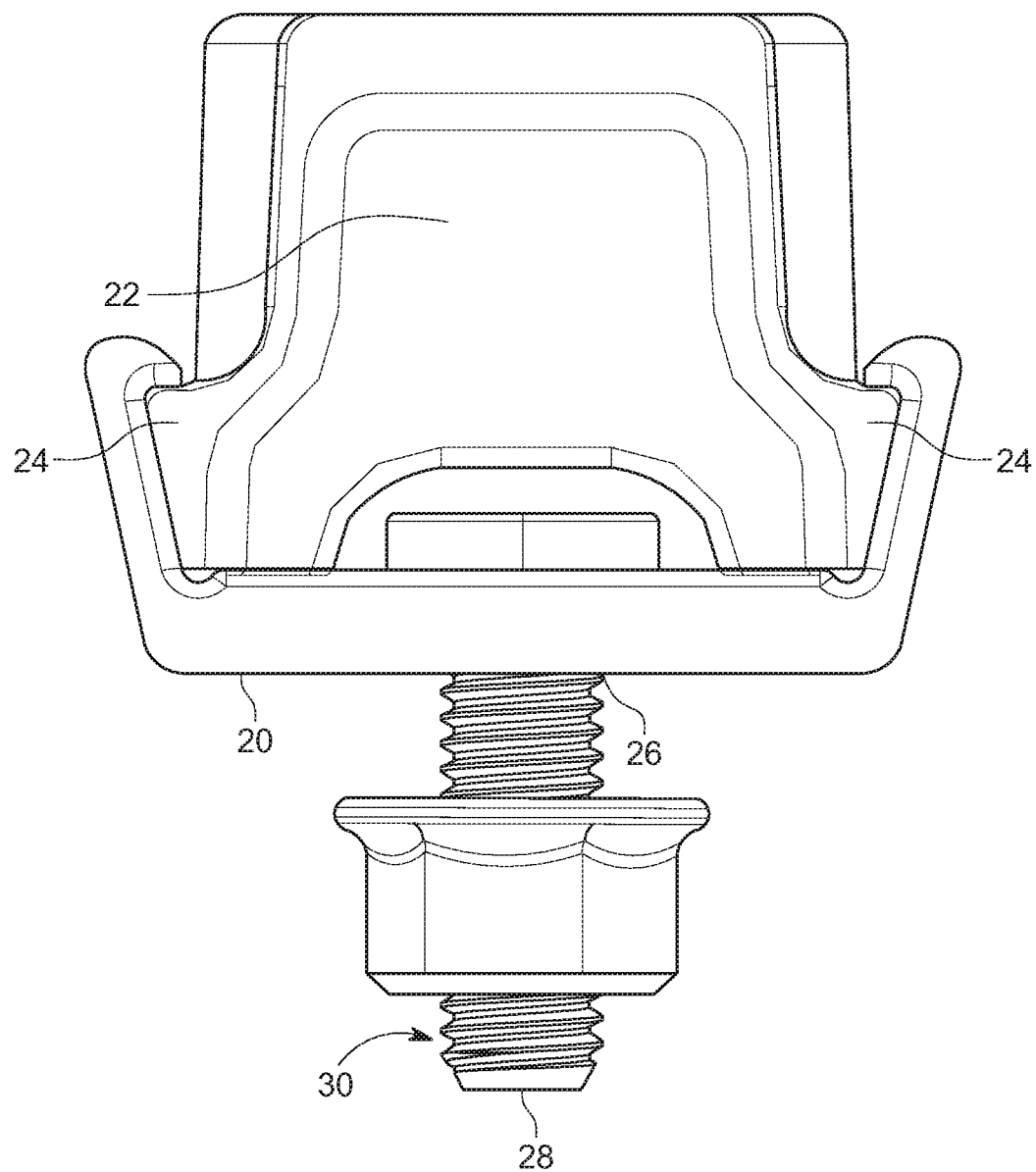
FIG. 4 is another side view of the embodiment of the coupling of FIG. 3 attached to a conduit discussed herein.

FIGS. 3 and 4 illustrate one embodiment of a coupling. This embodiment comprises a pair of opposing retention members 18 joined by a base 20. Each retention member 18 interfaces with a corresponding flange 22 disposed on opposing portions 24 of the conduit 10. In one embodiment, the base 20 includes an aperture 26 that receives a shank 28 of a fastener 30 to secure base 20, and thus the members 18, to a surface of at least one cross member 16. In this manner, a parallel retention method maintains a relationship between the conduit 10 and the at least one cross member 16.

Figure 5:
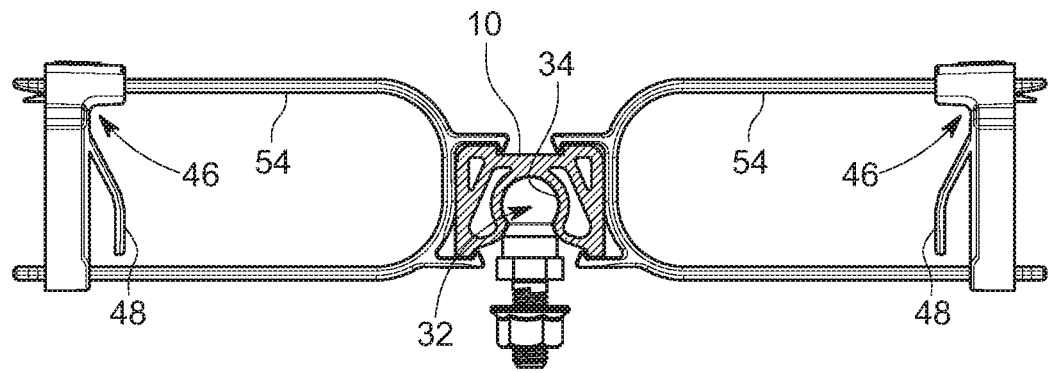
FIG. 5 is a partially sectioned view of another embodiment of a coupling discussed herein.
Figure 6:
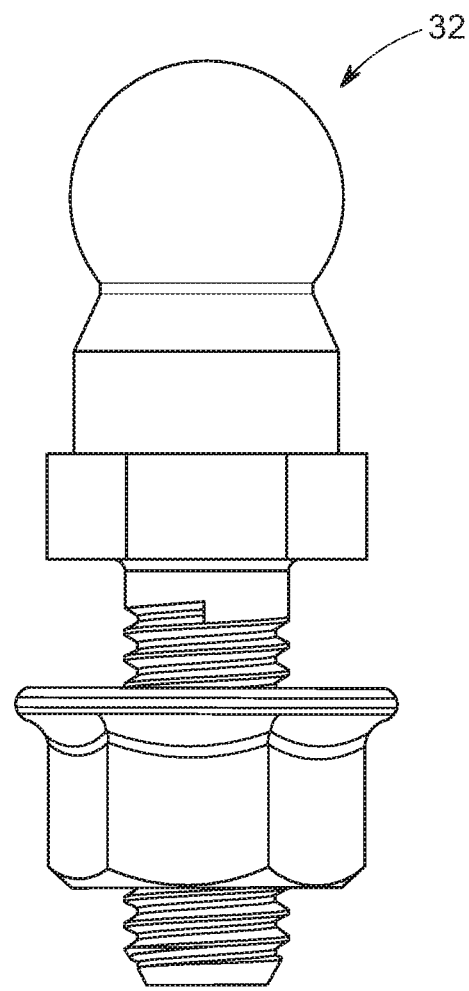
FIG. 6 is a side view of a portion of the coupling of FIG. 5.

Another embodiment of a coupling is shown in FIGS. 5 and 6. This embodiment comprises an articulation 32, such as a ball and socket system and the like. The articulation 32 can accommodate axial deflection in the vehicle 12 chassis thereby reducing communication of that axial articulation to the conduit 10. In some embodiments, the articulation 32 can interface with a segment 34 of the conduit 10.

FIGS. 7 through 10 show another embodiment of a coupling. A coupling may comprise a holder 36. The holder 36 comprises opposing limbs 38 that define a transitional radius 40 positioned at a convergence of a root of the limbs 38. This orientation also creates an area 42 within the holder 36. This area 42 may contain any desired articles, such as the conduit 10, a cable, a harness, a hose, an optical fiber, lines and the like. At least one cleat 44 disposed on the holder 36 joins the holder 36 with the frame rail 14. The holder 36 can be, at least one of added, removed, and relocated along the frame rail 14, for instance, by reducing distance between the limbs 38 thereby causing the at least one cleat 44 to change correspondingly a distance between the at least one cleat 44 and the frame rail 14.

At any appropriate time, such as once the holder 36 is in place with respect to the frame rail 14, the holder 36 can be fixed with respect to the frame rail 14 by introducing a retainer 46, shown in FIGS. 5, 7 and 9 through 12. The retainer 46 includes a space 50 for accepting one the limbs 38 of the holder 36. At least one ridge 52 is disposed on the retainer 46 adjacent the space 50. When the retainer 46 is assembled with the holder 36, the at least one ridge 52 on the retainer 46 can interface with at least one ridge 54, shown in FIGS. 5, 8 and 9, on at least one limb 38 of the holder 36. In this manner, the retainer 46 can be at least one of positively located and positively retained in position with respect to the holder 36.

Figure 7:
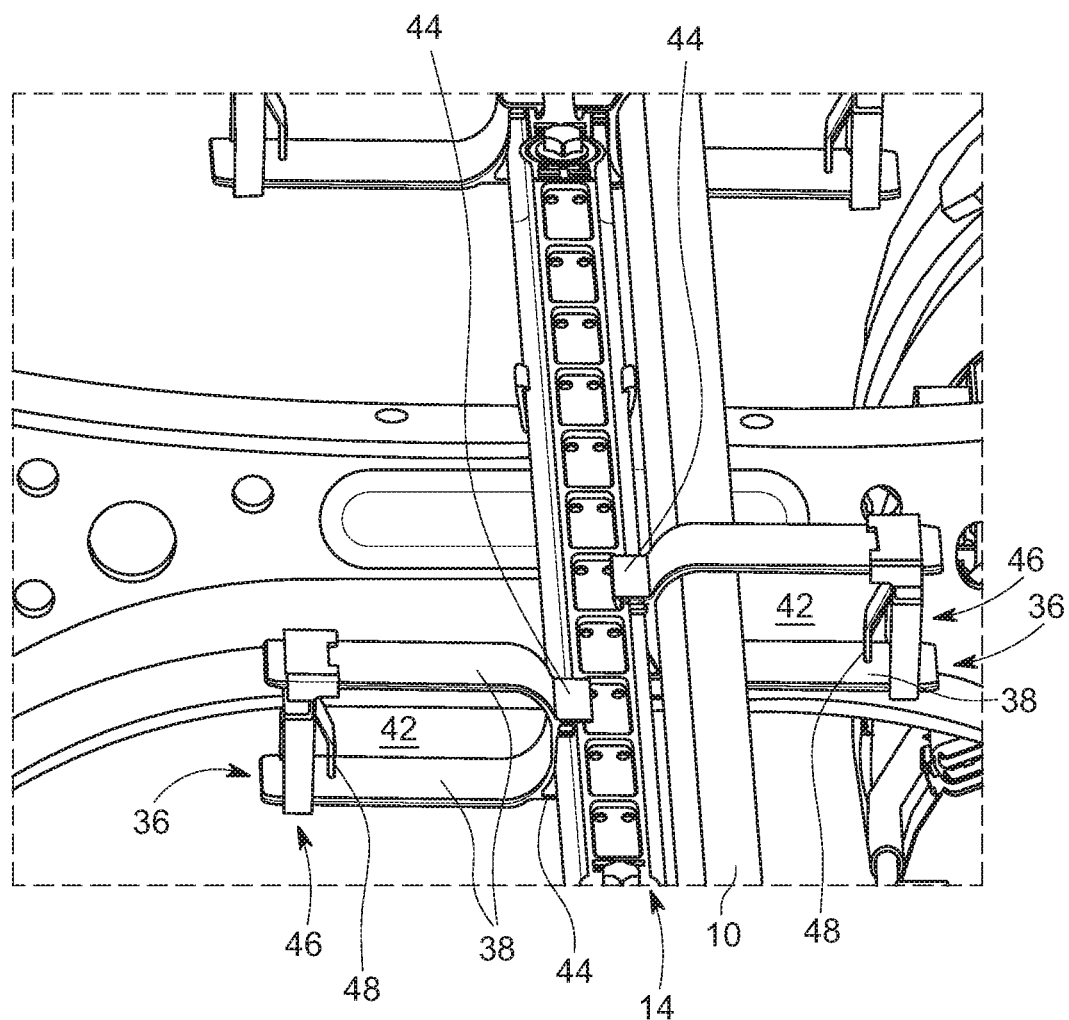
FIG. 7 is a perspective view of an embodiment of a structure for assembling a vehicle discussed herein.
Figure 8:
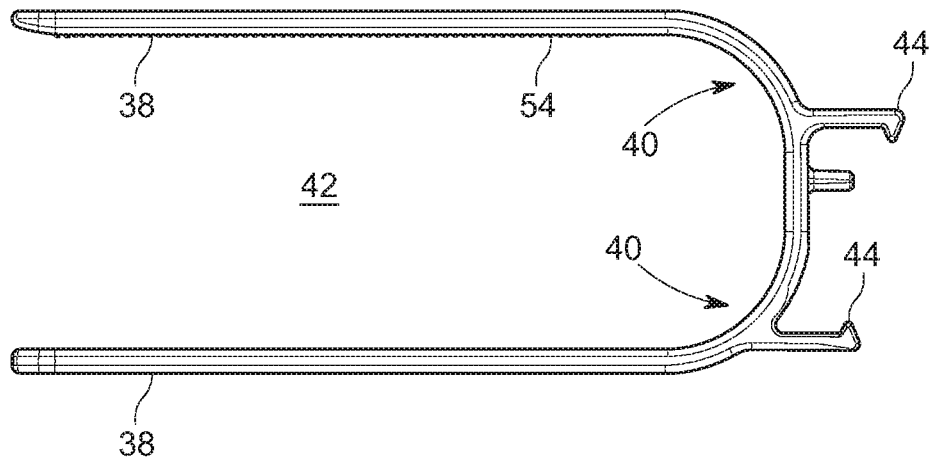
FIG. 8 is a side view of a portion of the embodiment shown in FIG. 7.
Figure 9:
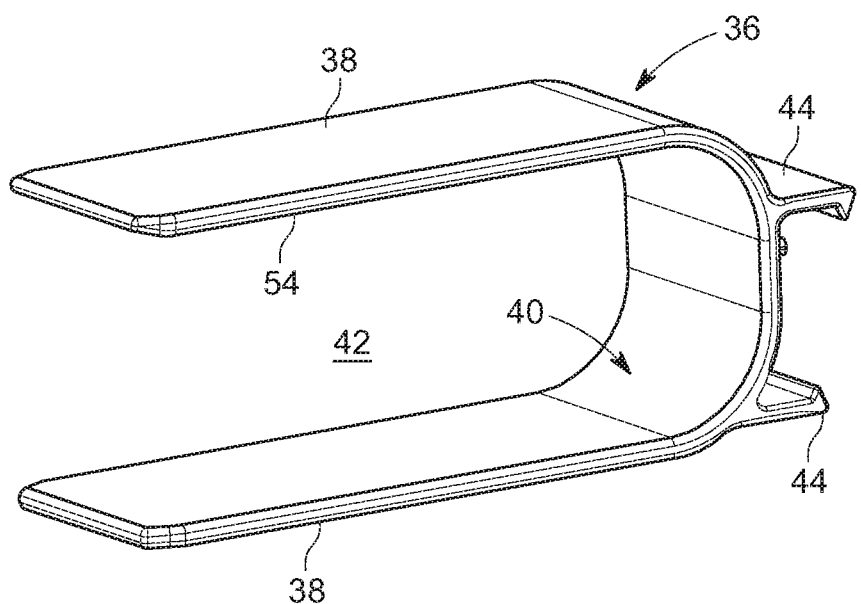
FIG. 9 is a perspective view of the portion of FIG. 8.
Figure 10:
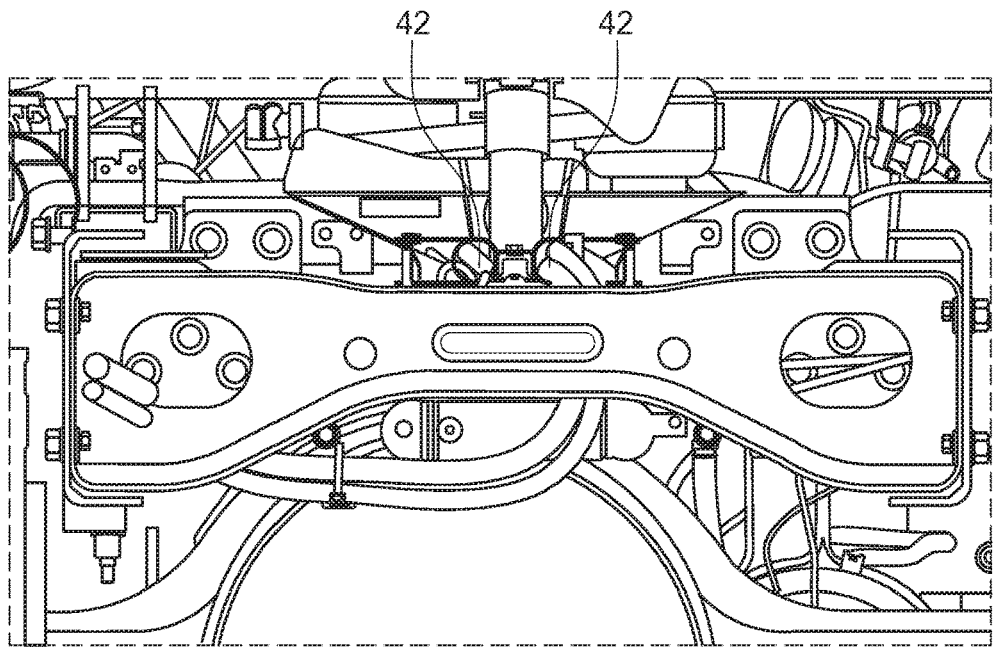
FIG. 10 is a perspective view of a portion of a vehicle having an embodiment of a structure for assembling a vehicle discussed herein.
Figure 11:
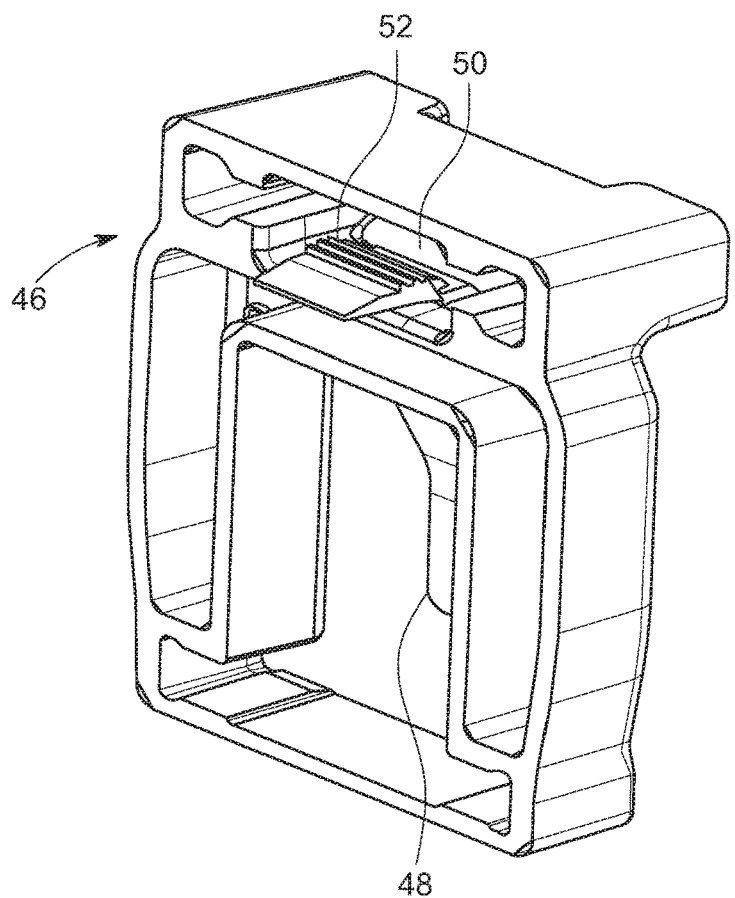
FIG. 11 is a perspective view of an embodiment of a retainer comprising a portion of an embodiment of a structure for assembling a vehicle discussed herein.
Figure 12:
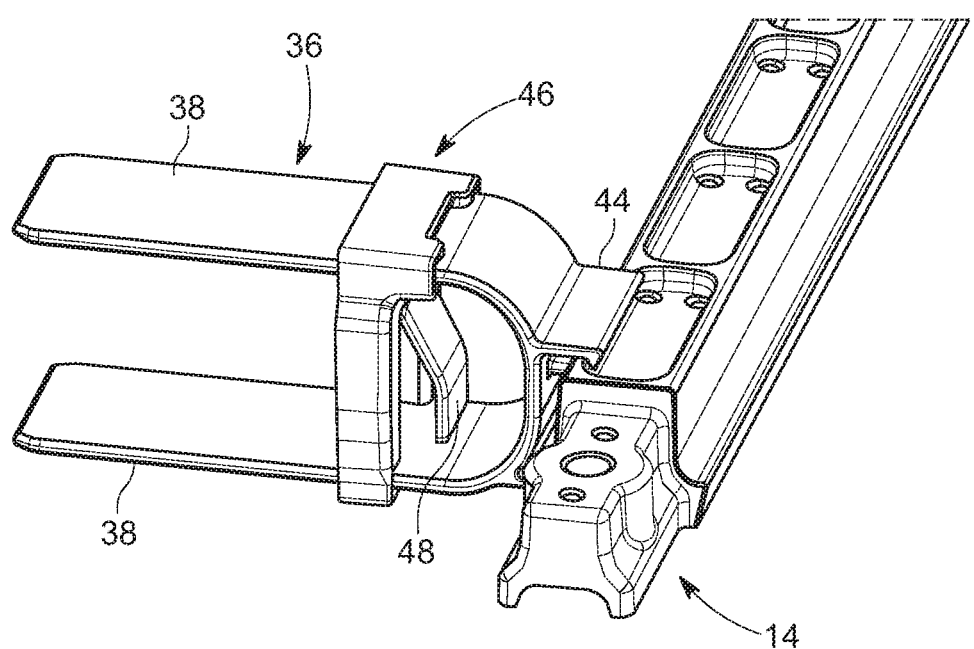
FIG. 12 is perspective view of the retainer of FIG. 11 attached to a portion of a frame rail comprising a vehicle discussed herein.

Additionally, the holder 46 can include a spring 48, such as a preloaded integral bias spring and the like, shown in FIGS. 5 and 7. The spring 48 can provide, among other things, preload communicated to routing elements, such as cables, harnesses, hosing, lines and the like, striction retention force between the radius 40 and the limbs 38.

It is to be noted that any of the above disclosed embodiments of a coupling, and any combination of those embodiments, can be used on a given vehicle 12. The coupling 10 and its elements can provide any of a number of benefits. For example, but not limited to, reduction of manufacturing complexity, improved quality and/or repeatability of vehicle 12 lifecycle, reliability and up time, improved simplicity and compatibility of wiring across a plurality of vehicle 12 models, reduction in engineering efforts for new and/or subsequent designs of vehicle 12, and increased productivity. The conduit 10 can be preassembled, e.g. by various entities such as suppliers, and then shipped to a vehicle 12 assembler ready to be installed on a frame rail 14 assembly. Also, use of the conduit 10 can provide for reduction in tooling cost, and reduction of a plurality of wiring harness into a single conduit 10, possibly preloaded, on a single vehicle 12. The conduit 10 can comprise a single, continuously extruded embodiment trimmed to desired length prior to vehicle 12 assembly and delivery to a vehicle 12 assembly plant or it can comprise a plurality of scalable sections that can be preassembled to a desired length.

With embodiments of a structure for assembling a vehicle 12 having an axis of elongation, a frame rail 14 and a cross member 16 extending from the frame rail 14 being thusly disclosed, now embodiments of a method for assembling a vehicle 12 having an axis of elongation, a frame rail 14 and a cross member 16 extending from the frame rail 14 will be discussed.

According to one embodiment of a method for assembling a vehicle 12 having an axis of elongation, a frame rail 14 and a cross member 16 extending from the frame rail 14, a conduit 10 extends along the axis of elongation of the vehicle 12. A conveyor 13 is disposed in the conduit 10. At least one coupling attaches the conduit 10 with at least one of the frame rail 14 and the cross member 16. A conveyor 13 is added to the conduit 10 either before or after the conduit 10 is attached with at least one of the frame rail 14 and the cross member 16. The conveyor 13 comprises at least one of an electrical conductor, an optical fiber and a push pull cable.

What is claimed is:

1. A structure for assembling a vehicle having an axis of elongation, a frame rail and a cross member extending from the frame rail, the structure comprising:
    a conduit extending along the axis of elongation of the vehicle;
    a conveyor disposed in the conduit;
    at least one coupling attaching the conduit with at least one of the frame rail and the cross member; wherein the at least one coupling includes a holder having opposing limbs; and
    at least one cleat disposed on the holder joining the holder with the frame rail.

2. A structure as defined in claim 1 wherein the at least one coupling includes a pair of opposing retention members, a base joining the pair of opposing retention members, and a flange disposed on the conduit.

3. A structure as defined in claim 2 further comprising:
    an aperture included with the base; and
    a fastener received by the aperture.

4. A structure as defined in claim 1 wherein the at least one coupling includes an articulation that interfaces with the conduit.

5. A structure as defined in claim 4 wherein the articulation comprises a ball and socket system.

6. A structure as defined in claim 1 further comprising:
    a retainer having a space that accepts one of the opposing limbs of the holder.

7. A structure as defined in claim 6 further comprising:
    at least one ridge disposed on the retainer adjacent the space; and
    at least one ridge disposed on at least one of the opposing limbs of the holder, the at least one ridge disposed on the retainer interfacing with the at least one ridge on at least one of the opposing limbs of the holder.

8. A structure as defined in claim 1 further comprising:
    a spring included on the holder.

9. A structure as defined in claim 1 wherein the conveyor includes at least one of an electrical conductor, an optical fiber and a push pull cable.

* * * * *